United States Patent
Fan

(10) Patent No.: US 12,146,252 B2
(45) Date of Patent: Nov. 19, 2024

(54) METHOD FOR PREPARING AUTOMATIC TEMPERATURE CONTROL LIGHT CONVEYOR BELT

(71) Applicant: SHANGHAI YONGLI TRANSPORTATION SYSTEM CO., LTD., Shanghai (CN)

(72) Inventor: Bing Fan, Shanghai (CN)

(73) Assignee: SHANGHAI YONGLI TRANSPORTATION SYSTEM CO., LTD., Shanghai (CN)

(*) Notice: Subject to any disclaimer, the term of this patent is extended or adjusted under 35 U.S.C. 154(b) by 293 days.

(21) Appl. No.: 17/504,592

(22) Filed: Oct. 19, 2021

(65) Prior Publication Data
US 2022/0120004 A1    Apr. 21, 2022

(30) Foreign Application Priority Data
Oct. 20, 2020 (CN) .......................... 202011123652.6

(51) Int. Cl.
| | |
|---|---|
| *D06C 15/00* | (2006.01) |
| *B65G 15/34* | (2006.01) |
| *D06N 3/00* | (2006.01) |
| *D06N 7/00* | (2006.01) |

(52) U.S. Cl.
CPC ............. *D06C 15/00* (2013.01); *B65G 15/34* (2013.01); *D06N 3/0036* (2013.01); *D06N 3/0081* (2013.01); *D06N 7/00* (2013.01); *D06N 2205/08* (2013.01); *D06N 2205/20* (2013.01); *D06N 2211/04* (2013.01)

(58) Field of Classification Search
CPC ...... D06C 15/00; B65G 15/34; D06N 3/0036; D06N 3/0081; D06N 7/00; D06N 2205/08; D06N 2205/20; D06N 2211/04
See application file for complete search history.

(56) References Cited

U.S. PATENT DOCUMENTS

| | | | |
|---|---|---|---|
| 2016/0059604 A1* | 3/2016 | Yoneda | B41M 5/3335 503/209 |
| 2016/0305063 A1* | 10/2016 | Rule | D06M 23/12 |
| 2017/0165627 A1* | 6/2017 | Duan | A01N 25/28 |
| 2018/0215983 A1* | 8/2018 | Bardsley | C09K 5/063 |

FOREIGN PATENT DOCUMENTS

| | | | | |
|---|---|---|---|---|
| CN | 105111588 B | * | 7/2017 | |
| CN | 107815089 A | * | 3/2018 | ............. B65G 15/34 |

OTHER PUBLICATIONS https://www.chemicalbook.com/ChemicalProductProperty_EN_CB5128662.htm (Year: 2010).*

* cited by examiner

*Primary Examiner* — Jacob T Minskey
*Assistant Examiner* — Stephen M Russell
(74) *Attorney, Agent, or Firm* — Jordan IP Law, LLC; Todd A. Vaughn

(57) ABSTRACT

Disclosed is a method for preparing an automatic temperature control light conveyor belt, including: drying and setting a polyester fabric, to obtain a pretreated polyester fabric; blending microcapsules and TPU, and granulating, to obtain a modified TPU; coating a glue onto a surface of the pretreated polyester fabric, to obtain a coated polyester fabric; and calendering the modified TPU onto a surface of the coated polyester fabric, to obtain the automatic temperature control light conveyor belt.

15 Claims, No Drawings

METHOD FOR PREPARING AUTOMATIC TEMPERATURE CONTROL LIGHT CONVEYOR BELT

CROSS REFERENCE TO RELATED APPLICATIONS

The present application claims priority to Chinese Patent Application No. 202011123652.6 (filed on Oct. 20, 2020), the entire content of which is incorporated herein by reference in its complete entirety.

TECHNICAL FIELD

The present disclosure relates to the technical field of conveyor belts in the food industry, in particular to a method for preparing an automatic temperature control light conveyor belt.

BACKGROUND

Conveyor belt is widely used in the food processing industry. For example, polyurethane (PU) light conveyor belt generally with a polyester fabric as a skeleton material is mainly used to transport light-weight and medium-weight objects. The PU light conveyor belt is widely used in food baking industries due to its light weight, long life, easy installation, and resistance to friction. However, baked goods generally have a certain temperature after they leave the oven, and the conventional PU conveyor belt has poor temperature resistance, which lead to the accelerated aging of the conveyor belt when transporting objects with high temperature, causing the PU and polyurethane skeleton to separate and crack, which has an adverse effect on the use of the conveyor belt. Further, PU has a low heat capacity, which limits the temperature resistance of PU.

In the prior art, according to conventional methods, a temperature-resistant glue is used instead of the conventional PU glue as a bonding material between PU and polyester fabrics. However, even if the temperature-resistant glue is used, it would undergo aging and degradation during use, which cannot fundamentally improve temperature-resistant performance of the conveyor belt.

SUMMARY

In view of the above problems in the prior art, an object of the present disclosure is to provide a method for preparing an automatic temperature control light conveyor belt without improving the polyester fabric skeleton, in which a modified TPU (thermoplastic polyurethanes) is bonded to the surface of the polyester fabric, and microcapsules in the modified TPU are used to absorb or release heat to control the temperature of the conveyor belt, which could improve the service life of the conveyor belt. The microcapsules in the modified TPU do not contact with the outside, thus not affecting the safety of the conveyor belt.

In order to achieve the above object, the present disclosure provides the following technical solutions:

A method for preparing an automatic temperature control light conveyor belt, comprising:
step a1: drying and setting a polyester fabric, to obtain a pretreated polyester fabric;
step a2: blending microcapsules and TPU, and granulating, to obtain a modified TPU;
step a3: coating a glue onto a surface of the pretreated polyester fabric obtained in step a1, to obtain a coated polyester fabric; and
step a4: calendering the modified TPU obtained in step a2 onto a surface of the coated polyester fabric obtained in step a3, to obtain the automatic temperature control light conveyor belt.

In some embodiments, drying and setting the polyester fabric in step a1 is performed by far-infrared heating, and the drying and setting is performed at a temperature of 180-200° C.

In some embodiments, in step a2, the microcapsules are used in an amount of 2.5%-5% by mass, based on the total mass of the microcapsules and TPU.

In some embodiments, in step a2, the microcapsules and TPU are blended in proportions, and added to a twin-screw extruder with a temperature of 160° C.-180° C. and an output of 2 kg/h.

In some embodiments, in step a3, a PU glue is coated onto an upper surface of the pretreated polyester fabric, and then dried at a temperature of 150° C.

In some embodiments, in step a4, the modified TPU is calendered on the upper surface of the coated polyester fabric under a temperature of 200° C.-210° C., a film thickness of 0.3 mm, and a composite pressure of 15 Pa-20 Pa. During the calendering process, the surface of the coated polyester fabric is maintained at a temperature of 130° C.-150° C.

In some embodiments, step a1, step a3 and step a4 are carried out successively, and step a2 is carried out before step a4.

In some embodiments, the microcapsule includes a shell and an inner core, wherein the shell is made of melamine, and the inner core is made of a phase change material. The microcapsule is formed by encapsulating the outside of the inner core with the shell.

When the temperature reaches 90° C.-110° C., the phase change material in the microcapsule undergoes a phase change from liquid to gas, absorbing external heat; when the temperature reaches 30° C.-50° C., the phase change material undergoes a phase change from gas to liquid, releasing the absorbed heat.

The microcapsules have a size of 100-120 microns, and the shell has a thickness of 20-30 microns.

Compared with the prior art, the present disclosure has the following beneficial effects: the modified TPU is bonded to the surface of the polyester fabric, and the microcapsules in the modified TPU are used to absorb or release heat to control the temperature without improving the polyester fabric skeleton. Depending on the performance of the conveyor belt, it is designed to have an endothermic zone and an exothermic zone, and the inner core in the microcapsules is determined according to the temperature requirements, so that the conveyor belt would absorb and release heat in the endothermic zone and the exothermic zone respectively during use, keeping the conveyor belt at a lower temperature automatically, which could improve the service life of the conveyor belt. Moreover, the microcapsules in the TPU do not contact with the outside, thus not affecting the safety of the conveyor belt.

DETAILED DESCRIPTION OF THE EMBODIMENTS

The method for preparing an automatic temperature control light conveyor belt provided by the present disclosure would be further described in detail and completely below in conjunction with examples. The examples described below are exemplary, and are only used to explain the present disclosure, but should not be construed as limiting the present disclosure.

A method for preparing an automatic temperature control light conveyor belt, comprising:
  step a1: drying and setting a polyester fabric, to obtain a pretreated polyester fabric;
  step a2: blending microcapsules and TPU, and granulating, to obtain a modified TPU;
  step a3: coating a glue onto a surface of the pretreated polyester fabric obtained in step a1, to obtain a coated polyester fabric; and
  step a4: calendering the modified TPU obtained in step a2 onto a surface of the coated polyester fabric obtained in step a3, to obtain the automatic temperature control light conveyor belt.

TPU is the abbreviation of Thermoplastic Urethane, which has a Chinese name of Thermoplastic Polyurethane Elastomer.

In some embodiments, drying and setting a polyester fabric in step a1 is performed by far-infrared heating, and the drying and setting is performed at a temperature of 180-200° C.

In some embodiments, in step a2, the microcapsules are used in an amount of 2.5%-5% by mass, and TPU is used in an amount of 95%-97.5% by mass, based on the total mass of the microcapsules and TPU.

The blending in step a2 is performed as follows: the microcapsules and TPU are blended in proportions, and added to a twin-screw extruder with a temperature of 160° C.-180° C. and an output of 2 kg/h.

In some embodiments, in step a3, a PU glue is coated onto an upper surface of the pretreated polyester fabric, and then dried at a temperature of 150° C.

In some embodiments, in step a4, the modified TPU is calendered onto the upper surface of the coated polyester fabric under a temperature of 200° C.-210° C., a film thickness of 0.3 mm, and a composite pressure of 15 Pa-20 Pa. During the calendering process, the surface of the coated polyester fabric is maintained at a temperature of 130° C.-150° C.

It should be noted that step a1, step a3 and step a4 may be carried out successively, and step a2 may be carried out before step a4.

When the temperature reaches 90° C.-110° C., the phase change material in the microcapsule undergoes a phase change from liquid to gas, absorbing external heat; when the temperature reaches 30° C.-50° C., the phase change material undergoes a phase change from gas to liquid, releasing the absorbed heat.

According to the present disclosure, the microcapsule includes a shell and an inner core, wherein the inner core is made of a phase change material. The microcapsule is formed by encapsulating the outside of the phase change material with the shell. The shell is made of melamine. The phase change material of the inner core of the microcapsule includes one or more dodecane derivatives, including but not limited to N, N-dimethyldodecylamine-N-oxide, N, N-dimethyldodecylamine, 1,12-diaminododecane, dodecylamine, N, N-dimethyldodecan-1-amine oxide, hydroquinone bis(2-hydroxyethyl) ether, hexamidine diisethionate, and sodium dodecylbenzene sulfonate. The inner core of the microcapsule includes one or more of the above phase change materials, which are mixed in any ratio in the prior art to obtain a microcapsule with the above heat absorption and heat release properties.

The microcapsules have an outer diameter of 100-120 microns, and the shell has a thickness of 20-30 microns.

The working principle of the present disclosure is that the phase change material would undergo phase change at a certain temperature, such as changing from solid to liquid, or from liquid to gas. During the phase change, the phase change material would absorb a large amount of heat, which could reduce the ambient temperature. In the present disclosure, the phase change material is added to the PU conveyor belt, and used to absorb or release heat by phase change, which could keep the temperature of the conveyor belt at a required level. At 90° C.-110° C., the phase change material in the microcapsule undergoes a phase change from liquid to gas, absorbing external heat, thus keeping the conveyor belt body at a lower temperature; at 30° C.-50° C., the phase change material in the microcapsule undergoes a phase change from gas to liquid, releasing the absorbed heat, thus preparing for absorbing heat again.

Finally, it is necessary to explain here that the above embodiments are only used to further describe the technical solutions of the present disclosure in detail, and cannot be understood as limiting the scope of protection of the present disclosure. Some non-essential improvements and adjustments made by those skilled in the art based on the above content of the present disclosure belong to the protection scope of the present disclosure.

What is claimed is:

1. A method for preparing an automatic temperature control light conveyor belt, the method comprising:
  drying and setting a polyester fabric, to obtain a pretreated polyester fabric; blending microcapsules and TPU, and granulating, to obtain a modified TPU; coating a glue onto a surface of the pretreated polyester fabric, to obtain a
  coated polyester fabric; and
  calendering the modified TPU onto a surface of the coated polyester fabric, to obtain the automatic temperature control light conveyor belt,
  wherein each microcapsule comprises a shell and an inner core formed of a phase change material that is one or more selected from the group consisting of N,N-dimethyldodecylamine-N-oxide, N,N-dimethyldodecylamine, 1,12- diaminododecane, N,N-dimethyldodecan-1-amine oxide, hydroquinone bis(2-hydroxyethyl) ether, and hexamidine diisethionate, and the microcapsules are used in an amount of 2.5% by mass, based on a total mass of the microcapsules and TPU.

2. The method of claim 1, wherein drying and shaping the polyester fabric is performed by far-infrared heating.

3. The method of claim 2, wherein the drying and setting is performed at a temperature of 180-200° C.

4. The method of claim 1, wherein the microcapsules and TPU are blended, and added to a twin-screw extruder with a temperature of 160-180° C., and an output of 2 kg/h.

5. The method of claim 1, wherein the glue comprises a PU glue.

6. The method of claim 5, wherein the PU glue is coated onto an upper surface of the pretreated polyester fabric, and dried at a temperature of 150° C.

7. The method of claim 1, wherein the modified TPU is calendered onto an upper surface of the coated polyester fabric under a temperature of 200-210° C., and a film thickness of 0.3 mm.

8. The method of claim 7, wherein during the calendering process, the surface of the coated polyester fabric is maintained at a temperature of 130-150° C.

9. The method of claim 1, wherein the drying and setting, the coating, and the calendaring are carried out successively.

10. The method of claim 9, wherein the blending is carried out before the calendering.

11. The method of claim 1, wherein the shell is made of melamine.

12. The method of claim 11, wherein each microcapsule is formed by encapsulating an outside of the inner core with the shell.

13. The method of claim 12, wherein the phase change material undergoes a phase change from liquid to gas at a temperature of 90-110° C., absorbing external heat.

14. The method of claim 13, wherein the phase change material undergoes a phase change from gas to liquid at a temperature of 30-50° C., releasing the absorbed heat.

15. The method of claim 11, wherein the microcapsules have a size of 100-120 microns and the shell has a thickness of 20-30 microns.

* * * * *